United States Patent
Banasik et al.

(10) Patent No.: US 10,606,708 B2
(45) Date of Patent: Mar. 31, 2020

(54) RISK MEASUREMENT DRIVEN DATA PROTECTION STRATEGY

(71) Applicant: International Business Machines Corporation, Armonk, NY (US)

(72) Inventors: Adam Banasik, Przemkowska (PL); Tomasz M. Gasiorowski, Kruszyn (PL); Daisy Mae L. Jose, Apex, NC (US); Geri D. McGrath, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/844,940

(22) Filed: Dec. 18, 2017

(65) Prior Publication Data

US 2018/0189147 A1 Jul. 5, 2018

Related U.S. Application Data

(63) Continuation of application No. 15/397,900, filed on Jan. 4, 2017.

(51) Int. Cl.
*G06F 11/14* (2006.01)
*G06F 21/62* (2013.01)
(Continued)

(52) U.S. Cl.
CPC ...... *G06F 11/1461* (2013.01); *G06F 11/1458* (2013.01); *G06F 11/2069* (2013.01);
(Continued)

(58) Field of Classification Search
CPC ............. G06F 11/1461; G06F 21/6245; G06F 11/1458; G06F 11/2069; G06F 11/2094; G06F 11/577; G06F 2221/034
See application file for complete search history.

(56) References Cited

U.S. PATENT DOCUMENTS 5,500,940 A 3/1996 Skeie
9,021,307 B1 4/2015 Parameswaran et al.
(Continued)

OTHER PUBLICATIONS

Johnson et al., "Fundamentals of Continuous Monitoring an Integral Part of Risk Management Strategies and Considerations for SP 800-53 Revision 4," Federal Computer Security Program Managers' Forum Annual Offsite, Jun. 5, 2013, Computer Security Division, Information Technology Laboratory. (Year: 2013).*
(Continued)

*Primary Examiner* — Jay A Morrison
(74) *Attorney, Agent, or Firm* — Maeve M. Carpenter; Maxine L. Barasch; Keohane & D'Alessandro PLLC

(57) ABSTRACT

Techniques are disclosed for dynamically changing a data protection plan based on a risk score. The risk score is continuously or periodically recalculated based on situational factors that are detected from external modules. The situational factors can include natural phenomena such as weather, fire, and seismic activity. The situational factors can include manmade phenomena such as financial conditions, political stability in the region where the data resides, war, terrorist attacks, and the like. The situational factors are retrieved from one or more external modules. The external modules may be IoT (Internet of Things) modules. The external modules are monitored, and as new data from the external modules becomes available, a risk score for stored data is computed. The risk score is then used to select an appropriate data protection plan.

16 Claims, 8 Drawing Sheets

(51) Int. Cl.
*G06F 11/20* (2006.01)
*G06F 21/57* (2013.01)

(52) U.S. Cl.
CPC ........ *G06F 11/2094* (2013.01); *G06F 21/577* (2013.01); *G06F 21/6245* (2013.01); *G06F 2221/034* (2013.01)

(56) References Cited

U.S. PATENT DOCUMENTS

| | | | |
|---|---|---|---|
| 9,361,481 | B2 | 6/2016 | LaFever et al. |
| 2001/0044795 | A1* | 11/2001 | Cohen .............. G06F 17/30699 |
| 2003/0037034 | A1* | 2/2003 | Daniels ............... G06Q 10/087 |
| 2005/0055357 | A1* | 3/2005 | Campbell .................. G06F 8/61 |
| 2005/0114573 | A1 | 5/2005 | Chen et al. |
| 2005/0193236 | A1 | 9/2005 | Stager et al. |
| 2009/0043831 | A1 | 2/2009 | Antonopoulos et al. |
| 2012/0089572 | A1 | 4/2012 | Raichstein et al. |
| 2013/0103823 | A1 | 4/2013 | DeJana et al. |
| 2013/0190899 | A1 | 7/2013 | Slessman et al. |
| 2014/0172668 | A1* | 6/2014 | McClintock ........... G06Q 40/04 705/37 |
| 2014/0173739 | A1* | 6/2014 | Ahuja .................. G06F 21/577 726/25 |
| 2015/0120777 | A1* | 4/2015 | Ramos .................. G06F 3/016 707/776 |
| 2017/0060694 | A1 | 3/2017 | Makhov et al. |
| 2017/0242969 | A1* | 8/2017 | Baudet .................. G06Q 50/24 |
| 2018/0143880 | A1* | 5/2018 | Dornemann ........ G06F 11/1469 |

OTHER PUBLICATIONS

Webpage archived on Feb. 9, 2016 of https://www.firstrade.com/content/en-us/researchtools/alerts. (Year: 2016).*

"Sensitivity and Criticality of Data", ISSP-0001: Sensitivity and Levels of Criticality, University of South Florida, Mar. 3, 2010, 3 pages.

"Comprehensive Continuous Risk Assessment Process", IP.Com Prior Art Database Technical Disclosure, IPCOM000158836D, Oct. 1, 2007, 16 pages.

"Tradeoff Analytics for risk management in IT project with mobile device", IP.Com Prior Art Database Technical Disclosure, IPCOM000243568D, Oct. 1, 2015, 7 pages.

Jay A. Morrison, USPTO Office Action, U.S. Appl. No. 15/397,900, dated Sep. 17, 2018, 30 pages.

Jay A. Morrison, USPTO Office Action, U.S. Appl. No. 15/397,900, dated Jan. 18, 2019, 29 pages.

Jay A. Morrison, USPTO Office Action, U.S. Appl. No. 15/397,900, dated Jul. 3, 2019, 28 pages.

Jay A. Morrison, USPTO Office Action, U.S. Appl. No. 15/397,900, Notification dated Jan. 4, 2017, 30 pages.

Jay A. Morrison, USPTO Notice of Allowance, U.S. Appl. No. 15/397,900, Notification dated Jan. 8, 2020, 14 pages.

* cited by examiner

Data Storage Self Assessment – External Module Configuration

ENABLED

| | | | |
|---|---|---|---|
| TEMPERATURE | X | LOW THRESH: -5 C | HIGH THRESH: 31 C |
| FIRE | X | | |
| SEISMIC | | | |
| SECURITY VUL. | X | | |
| FINANCIAL | X | StockPrice Low: $30 | StockPrice High: $70 |
| | | StockActivity Limit: 3 Million shares | |
| XYZ | | LOW THRESH: yy | HIGH THRESH: zz |

FIG. 5B

RISK MEASUREMENT DRIVEN DATA PROTECTION STRATEGY

RELATED APPLICATION

The present patent document is a continuation of U.S. patent application Ser. No. 15/397,900, filed Jan. 4, 2017, entitled "RISK MEASUREMENT DRIVEN DATA PROTECTION STRATEGY", the entire contents of which is incorporated herein by reference.

FIELD OF THE INVENTION

The present invention relates generally to computer data protection, and more particularly, to a risk measurement driven data protection strategy.

BACKGROUND

Data protection is an important part of managing most any computer system. Commerce, safety, and entertainment all depend on the availability of data residing on various computers around the world. While computers and storage hardware have become more reliable over time, there still exists a possibility for data loss due to equipment failure, human error, human malice, or other circumstance.

Networked data protection is a strategy for backing up data that involves sending a copy of the data over a proprietary or public network to an off-site server. The server could be hosted by a third-party service provider, who charges the backup customer a fee based on capacity, bandwidth, number of users, or other criteria. In addition to backup, recovery is also a concern to most businesses and government entities. In a critical operation, it can be important to restore data as quickly as possible. Data protection and recovery are part of risk mitigation for most any business or institution. It is therefore desirable to have improvements in data protection.

SUMMARY

In one aspect, there is provided a computer-implemented method comprising: assessing an initial criticality of data stored on a computer system; computing an initial risk score based on the initial criticality and a plurality of situational factors received from one or more external modules; selecting an initial data protection plan based on the initial risk score; monitoring the one or more external modules and computing a new risk score based on detected changes in at least one of the plurality of situational factors; and selecting a different data protection plan based on the new risk score.

In another aspect, there is provided a computer system comprising: a processor; a memory coupled to the processor, the memory containing instructions, that when executed by the processor, perform the steps of: assessing an initial criticality of data stored on a computer system; computing an initial risk score based on the initial criticality and a plurality of situational factors received from one or more external modules; selecting an initial data protection plan based on the initial risk score; monitoring the one or more external modules and computing a new risk score based on detected changes in at least one of the plurality of situational factors; and selecting a different data protection plan based on the new risk score.

In yet another aspect, there is provided a computer program product for implementing a data protection strategy for an electronic computing device comprising a computer readable storage medium having program instructions embodied therewith, the program instructions executable by a processor to cause the electronic device to: assess an initial criticality of data stored on a computer system; compute an initial risk score based on the initial criticality and a plurality of situational factors received from one or more external modules; select an initial data protection plan based on the initial risk score; monitor the one or more external modules and computing a new risk score based on detected changes in at least one of the plurality of situational factors; and select a different data protection plan based on the new risk score.

BRIEF DESCRIPTION OF THE DRAWINGS

Features of the disclosed embodiments will be more readily understood from the following detailed description of the various aspects of the invention taken in conjunction with the accompanying drawings.

FIG. 5B is an exemplary user interface for external module configuration in accordance with embodiments of the present invention.

Figure 1:
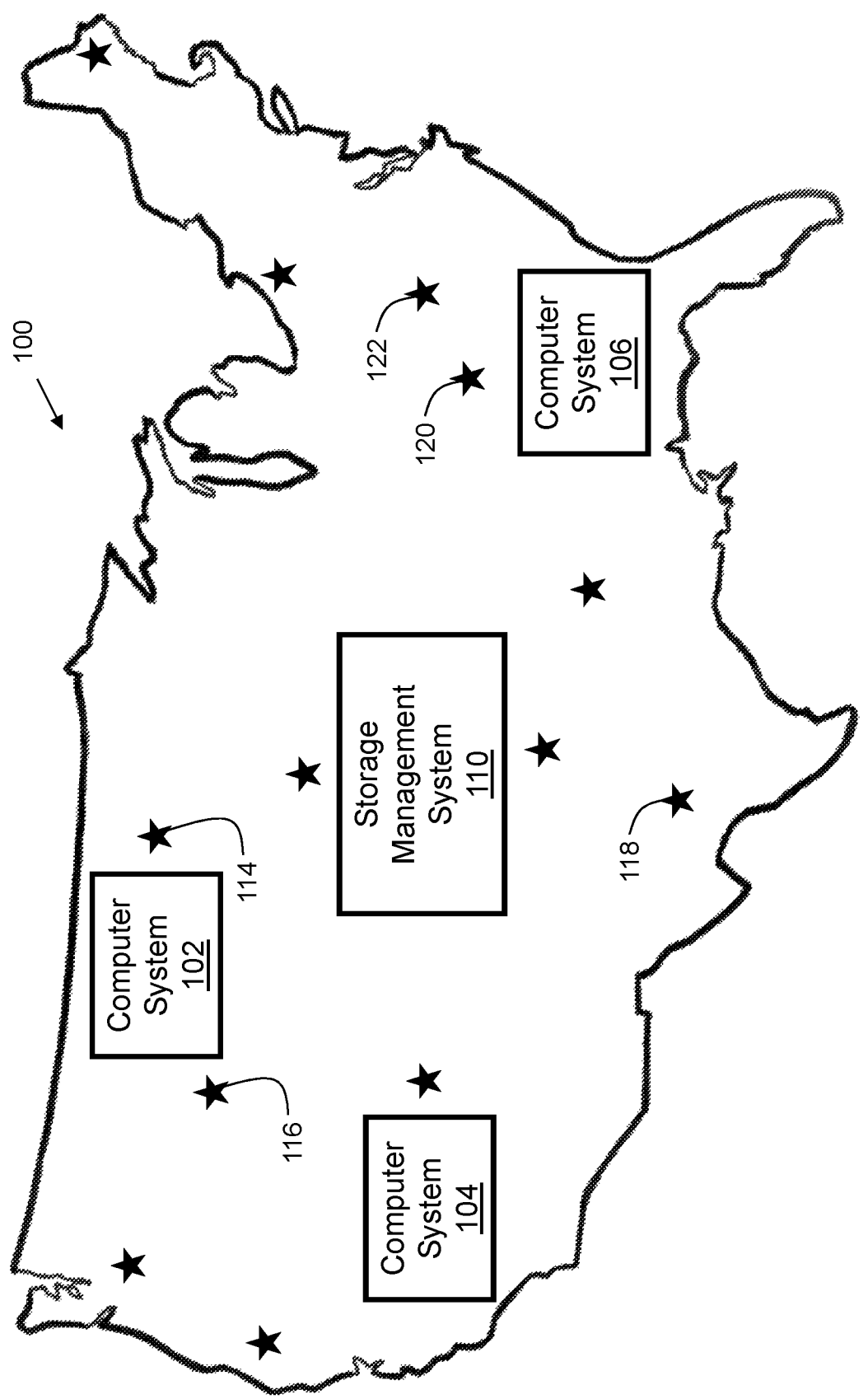
FIG. 1 shows a geographical block diagram in accordance with embodiments of the present invention.

The drawings are not necessarily to scale. The drawings are merely representations, not necessarily intended to portray specific parameters of the invention. The drawings are intended to depict only example embodiments of the invention, and therefore should not be considered as limiting in scope. In the drawings, like numbering may represent like elements. Furthermore, certain elements in some of the figures may be omitted, or illustrated not-to-scale, for illustrative clarity.

DETAILED DESCRIPTION

Techniques are disclosed for dynamically changing a data protection plan based on a risk score. The risk score is continuously or periodically recalculated based on situational factors that are detected from external modules. The situational factors can include natural phenomena such as weather, fire, and seismic activity. The situational factors can include manmade phenomena such as political stability in the region where the data resides, war, terrorist attacks, and other unrest in the region where the data resides. The situational factors can also or instead include security vulnerability status, which may include a computer security climate based on the latest computer viruses and worms. The situational factors may be retrieved from one or more external modules. The external modules may be IoT (Internet of Things) modules. The external modules are monitored, and as new data from the external modules becomes available, a risk score for stored data is computed. The risk score is then used to select an appropriate data protection plan. For example, as risk increases (e.g., due to a temporary condition such a hurricane), a different data protection plan can be implemented automatically based on the detected risk score. When the hurricane passes and the risk level returns to its normal level, the data protection plan can be reverted to a baseline protection plan.

The terminology used herein is for the purpose of describing particular embodiments only and is not intended to be limiting of this disclosure. As used herein, the singular forms "a", "an", and "the" are intended to include the plural forms as well, unless the context clearly indicates otherwise. Furthermore, the use of the terms "a", "an", etc., do not denote a limitation of quantity, but rather denote the presence of at least one of the referenced items. It will be further understood that the terms "comprises" and/or "comprising", or "includes" and/or "including", when used in this specification, specify the presence of stated features, regions, integers, steps, operations, elements, and/or components, but do not preclude the presence or addition of one or more other features, regions, integers, steps, operations, elements, components, and/or groups thereof.

Reference throughout this specification to "one embodiment," "an embodiment," "some embodiments", or similar language means that a particular feature, structure, or characteristic described in connection with the embodiment is included in at least one embodiment of the present invention. Thus, appearances of the phrases "in one embodiment," "in an embodiment," "in some embodiments", and similar language throughout this specification may, but do not necessarily, all refer to the same embodiment.

Moreover, the described features, structures, or characteristics of the invention may be combined in any suitable manner in one or more embodiments. It will be apparent to those skilled in the art that various modifications and variations can be made to the present invention without departing from the spirit and scope and purpose of the invention. Thus, it is intended that the present invention cover the modifications and variations of this invention provided they come within the scope of the appended claims and their equivalents. Reference will now be made in detail to the preferred embodiments of the invention.

FIG. 1 shows a geographical block diagram 100 in accordance with some embodiments of the present invention. Computer systems 102, 104, and 106 are dispersed in locations throughout the region, herein being the United States. Storage management system 110 monitors external modules, examples of which are pointed out at 114, 116, 118, 120, and 122. External modules, external to computer systems 102, 104, and 106, are distributed in various places. In embodiments, the monitoring the one or more external modules includes monitoring a subset of external modules configured and disposed within a predetermined distance of the computer system.

In the example shown, external modules 114 and 116 are applicable to computer system 102 because such modules are in proximity to that system. External modules 120 and 122 measure situational factors applicable to computer system 106 because of such modules' proximity to such computer system. It should be recognized that in implementations, the region could be a region other than the United States. For example, it could be another country, state, or the entire globe, etc. In addition, more or fewer computer systems, external modules, and storage management systems could be provided.

Figure 2:
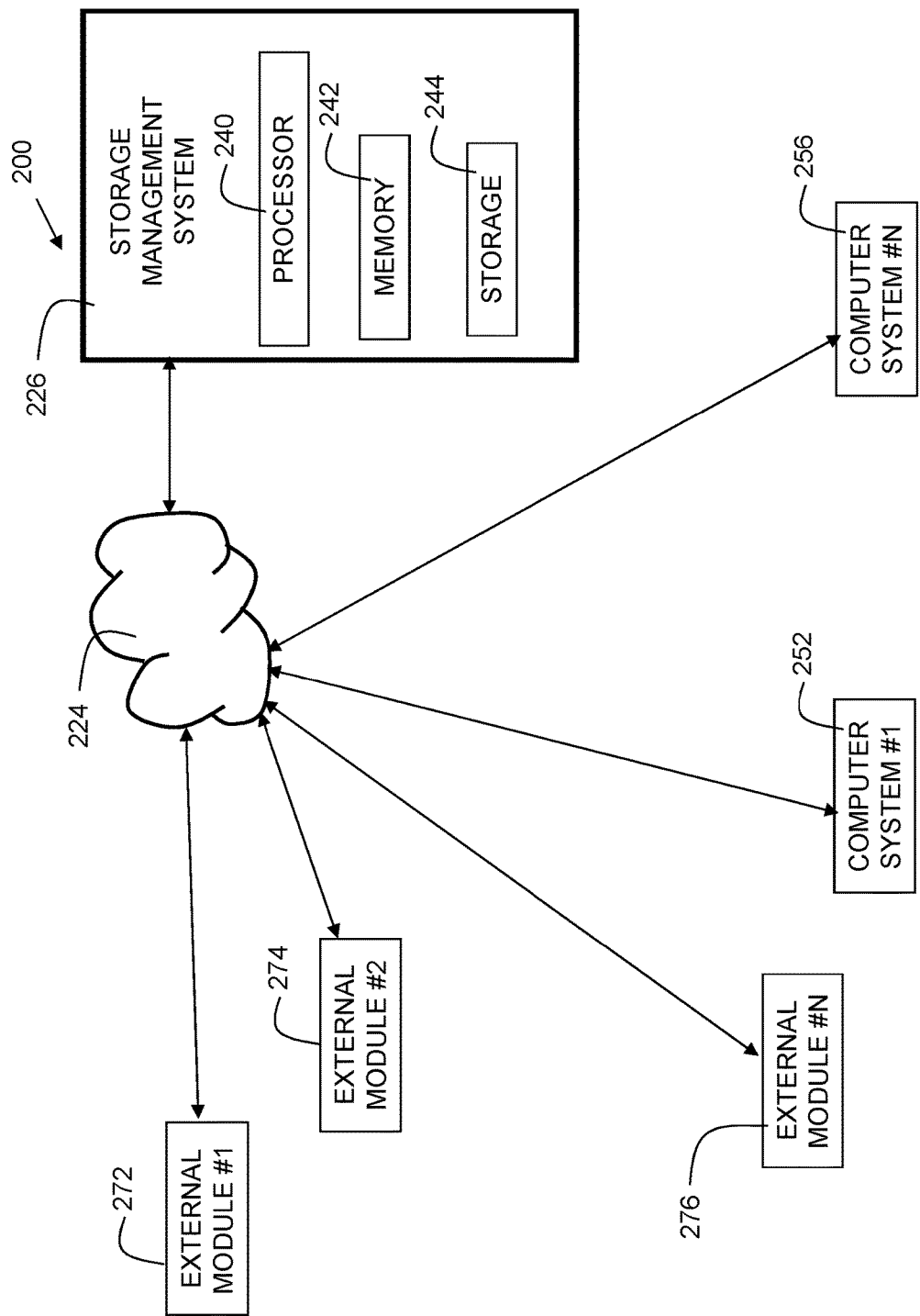
FIG. 2 is a network diagram of an embodiment of the present invention.

FIG. 2 is a network diagram 200 of some embodiments of the present invention. Computer system #1 252, computer system #N 256, external module #1 272, external module #2 274, external module #N 276, and storage management system 226 are in communication via network 224. Storage management system 226 has a processor 240, memory 242, and storage 244. Each of the external modules sends information to storage management system 226. Storage management system 226 stores and processes that information to determine whether the data protection plan needs to be increased (or decreased) at the pertinent computer system based on a criticality of the data and probability of a situational factor. The situational factors can include natural phenomena such as weather (wind, storm, flood, etc.), fire, and seismic activity. The situational factors can include manmade phenomena such as political stability in the region where the data resides, war, terrorist attacks, and other unrest in the region where the data resides. For example, an impending election, war, riots, or act of terrorism may indicate possible interruptions of data or destruction of systems. The situational factors can also include security vulnerability status, which may include a computer security climate based on the latest computer viruses and worms.

Figure 3:
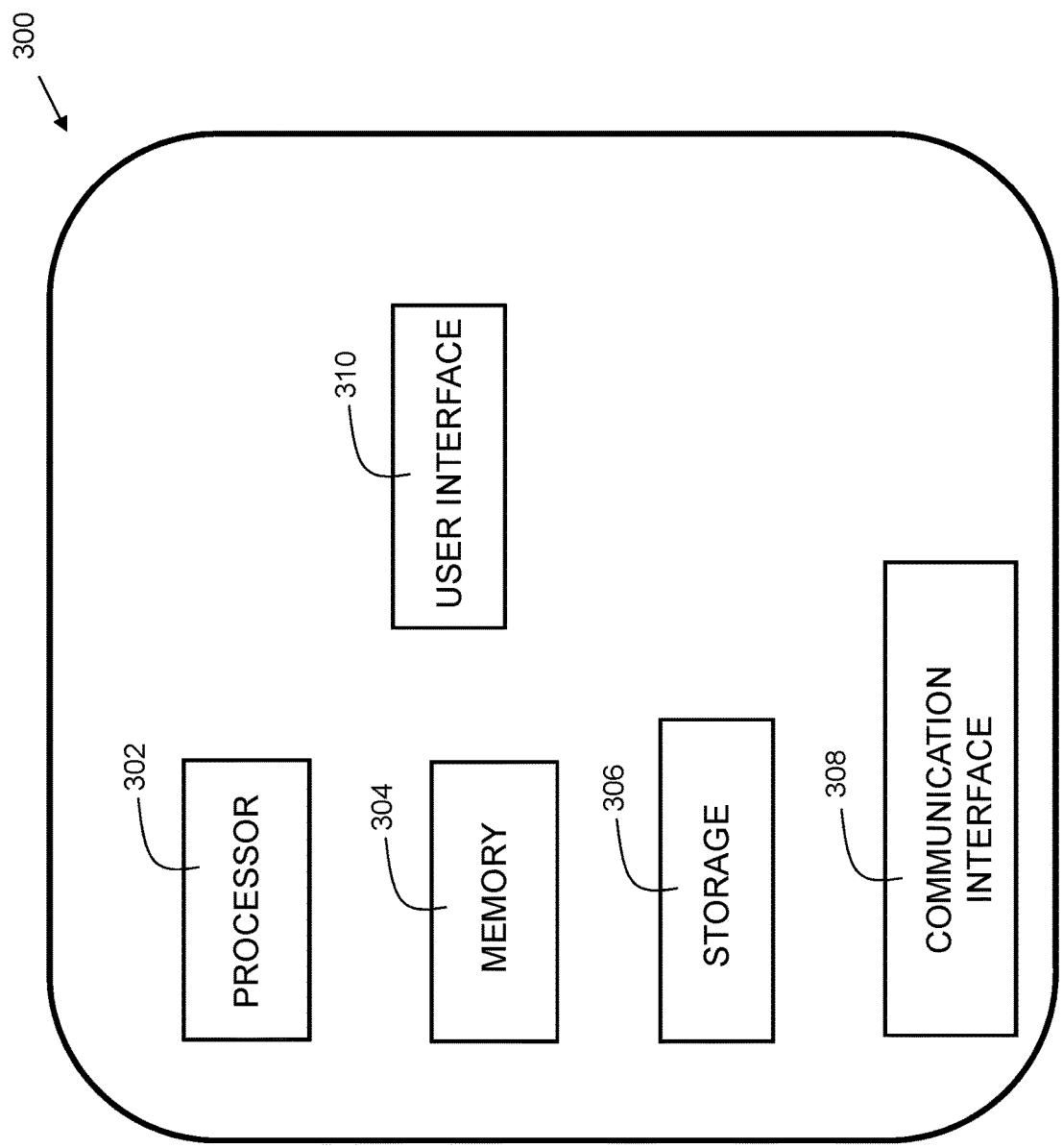
FIG. 3 is a block diagram of a storage management system in accordance with embodiments of the present invention.

FIG. 3 is a block diagram of a storage management system in accordance with embodiments of the present invention. Device 300 is shown as a simplified diagram of subcomponents. Device 300 is an electronic computing device. Device 300 includes a processor 302, which is coupled to a memory 304. Memory 304 may include dynamic random access memory (DRAM), static random access memory (SRAM), magnetic storage, and/or a read only memory such as flash, EEPROM, optical storage, or other suitable memory. In some embodiments, the memory 304 may not be a transitory signal per se.

Device 300 further includes storage 306. In embodiments, storage 306 may include one or more magnetic storage devices such as hard disk drives (HDDs). Storage 306 may additionally include one or more solid state drives (SSDs).

The memory 304 and storage 306 together provide memory for multiple applications to execute by processor 302. Memory 304 stores instructions, which when executed by the processor, may implement the steps of the present invention. In embodiments, device 300 may have multiple processors 302, and/or multiple cores per processor. The device 300 may execute an operating system that provides virtual memory management for the device 300. The processor 302 may have one or more cache memories therein.

Device 300 further includes a user interface 310, examples of which include a liquid crystal display (LCD), a plasma display, a cathode ray tube (CRT) display, a light emitting diode (LED) display, an organic LED (OLED) display, or other suitable display technology. The user interface 310 may further include a keyboard, mouse, or other suitable human interface device. In some embodiments, user interface 310 may be a touch screen, incorporating a capacitive or resistive touch screen in some embodiments.

The device 300 still further includes a communication interface 308. The communication interface 308 may be a wired communication interface that includes Ethernet, Gigabit Ethernet, or the like. In embodiments, the communication interface 308 may include a wireless communication interface that includes modulators, demodulators, and antennas for a variety of wireless protocols including, but not limited to, Bluetooth™, Wi-Fi, and/or cellular communication protocols for communication over a computer network.

Figure 4:
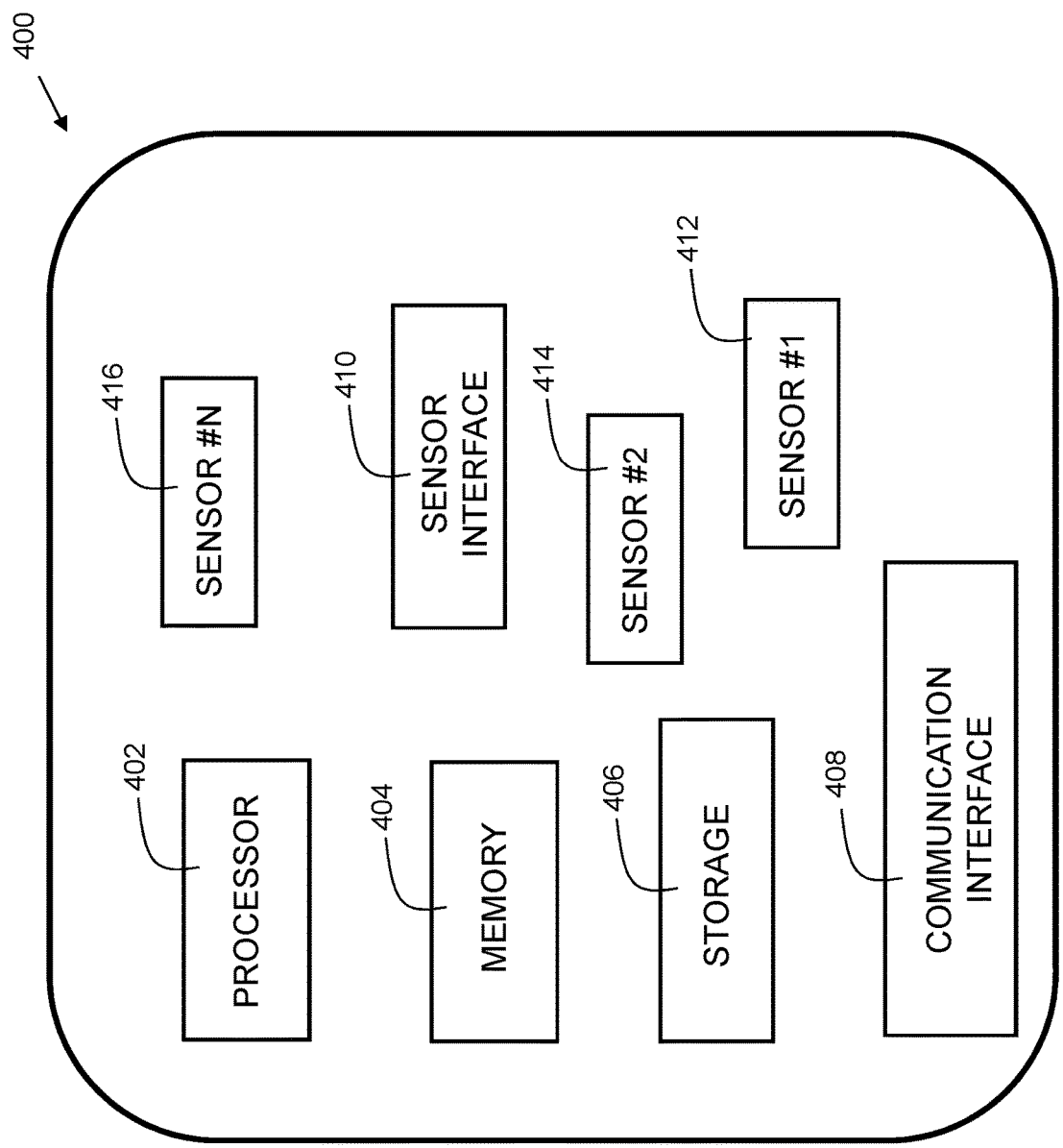
FIG. 4 is a block diagram of an external module in accordance with embodiments of the present invention.

FIG. 4 is a block diagram of an external module in accordance with embodiments of the present invention. External module 400 is shown as a simplified diagram of subcomponents. External module 400 is an electronic computing device. External module 400 includes a processor 402, which is coupled to a memory 404. Memory 404 may include dynamic random access memory (DRAM), static random access memory (SRAM), magnetic storage, and/or a read only memory such as flash, EEPROM, optical storage, or other suitable memory. In some embodiments, the memory 404 may not be a transitory signal per se.

External module 400 further includes storage 406. In embodiments, storage 406 may include one or more magnetic storage devices such as hard disk drives (HDDs). Storage 406 may additionally include one or more solid state drives (SSDs).

The memory 404 and storage 406 together provide memory for one or more applications to execute by processor 402. In embodiments, external module 400 may have multiple processors 402, and/or multiple cores per processor. External module 400 may execute an operating system that provides virtual memory management for the module 400. The processor 402 may have one or more cache memories therein. Memory 404 stores instructions, which when executed by the processor, may implement one or more steps of the present invention.

External module 400 further includes a communication interface 408. The communication interface 408 may be a wired communication interface that includes Ethernet, Gigabit Ethernet, or the like. In embodiments, the communication interface 408 may include a wireless communication interface that includes modulators, demodulators, and antennas for a variety of wireless protocols including, but not limited to, Bluetooth™, Wi-Fi, and/or cellular communication protocols for communication over a computer network.

External module 400 further includes a sensor interface 410 and sensors. Sensor interface 410 interfaces between the processor 402 and sensor #1 412, sensor #2 414, and sensor #N 416. In the example, external module 400 has three sensors. It should be recognized that in implementations, more or fewer sensors could be included within the scope and spirit of the invention.

Figure 5A:
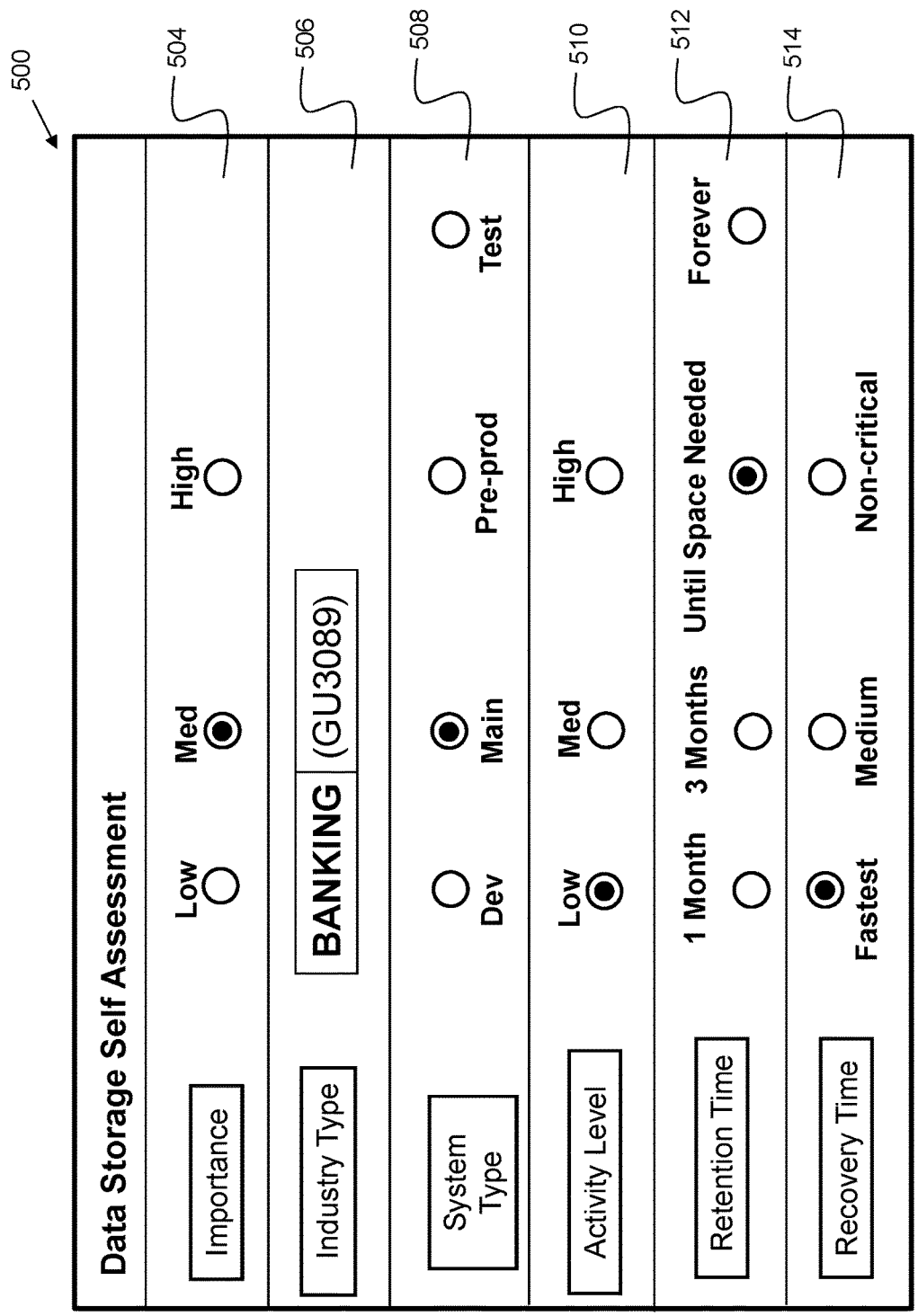
FIG. 5A is an exemplary user interface for performing an initial criticality assessment in accordance with embodiments of the present invention.

FIG. 5A is an exemplary user interface 500 for performing an initial criticality assessment in accordance with embodiments of the present invention. In some embodiments, the initial criticality of data is established by user input. The user input may be collected by an electronic survey (self-assessment). User interface 500 is an example of such a survey.

In embodiments, assessing an initial criticality includes receiving a data importance category, at 504. This may include a user inputting a level of importance that he, she, or the company deems for the data. In the example, there are radio buttons for low, medium, and high. The "medium" setting has been selected. It should be recognized that these options are examples, and in some embodiments, more, fewer, or different options may be displayed within the scope and spirit of the invention. Additionally, it should be recognized that radio buttons are used as an example, and in some embodiments, other selection inputs may be provided.

In embodiments, assessing an initial criticality includes receiving an industry category, at 506. Industries may be ranked according to a scale of "importance" or "sensitivity" of data. For example, defense may be the highest, with air traffic control after, and banking right behind it. On a lower level may be non-sensitive information such as backup of news articles. In the example, there is a drop down menu from which a user may select an industry. In the example, the user has selected "banking". In embodiments, there is an alphanumeric code associated with each industry. In the example shown, the code for "banking" is GU3089. The alphanumeric codes can be used to distinguish various specializations within an industry. For example, one code may be used for the generic industry of banking; another code may be used for the specialization of commercial banking, international banking, etc. In this way, if different types of banking have different data protection requirements, the alphanumeric code can be used to derive an industry score, where each alphanumeric code may correspond to an industry score. The industry score may be used in determining an overall importance of the data. It should be recognized that the drop down menu is an example, and in some embodiments, other selection mechanisms may be provided.

In embodiments, assessing an initial criticality includes receiving a system type category, at 508. The system type may play a role in how the data is ranked for criticality. In the example, radio button options are provided including Development, Main, Pre-production, and Test. Data relating to a system in pre-production may be of a higher criticality than data relating to a system in development. Data relating to a company's main product is of a higher criticality than data relating to a product in the market test phase. In the example, the radio button for "main" is selected. It should be recognized that these options are examples, and in some embodiments, more, fewer, or different options may be displayed within the scope and spirit of the invention. Additionally, it should be recognized that radio buttons are used as an example, and in some embodiments, other selection inputs may be provided.

In embodiments, assessing an initial criticality includes receiving a data activity category, at 510. In the example, radio buttons are provided for low, medium, and high levels of activity. Activity may mean how often, or the frequency that, the data is accessed. Data having a high level of activity will be ranked of higher criticality than data having less activity associated therewith. In the example, "low" is selected. It should be recognized that low, medium, and high are examples, and in some embodiments, more, fewer, or different options may be displayed within the scope and spirit of the invention. Additionally, it should be recognized that radio buttons are used as an example, and in some embodiments, other selection inputs may be provided.

In embodiments, assessing an initial criticality includes receiving a retention time category, at 512. Data with a longer required time of retention will be ranked of higher criticality than data with a lower required retention time. In the example, radio buttons for 1 month, 3 months, "Until Space Needed", and "forever" are provided. "Until Space Needed" is shown selected. It should be recognized that the disclosed options are examples, and in some embodiments, more, fewer, or different options may be displayed within the scope and spirit of the invention. Additionally, it should be recognized that radio buttons are used as an example, and in some embodiments, other selection inputs may be provided.

In embodiments, assessing an initial criticality includes receiving a recovery time category, at 514. Data with a longer time needed for recovery will be ranked of higher criticality than data with a lower amount of time necessary for recovery. In the example, radio buttons for "fastest", "medium", and "non-critical" are provided. "Fastest" is shown selected. It should be recognized that the disclosed options are examples, and in some embodiments, more, fewer, or different options may be displayed within the scope and spirit of the invention. Additionally, it should be recognized that radio buttons are used as an example, and in some embodiments, other selection inputs may be provided.

The above-identified examples of assessments are examples, and more, fewer, or different assessments may be included in implementations of embodiments of the invention.

The user selections shown in FIG. 5A may be used to compute a data importance score or level. In some embodiments, the data importance level may be categorized into low, medium, and high importance subcategories. In embodiments, each choice in the user interface of FIG. 5A is associated with a score, and the total score from all the user selections of FIG. 5A may then be averaged to determine an overall score, from which the data importance level is derived. In embodiments, the processor within the storage management system 110 performs this computation.

FIG. 5B is an exemplary user interface 550 for external module configuration in accordance with embodiments of the present invention. As shown in FIG. 5B, a user can set which sensors on a multi-sensor module are enabled. In the example, temperature, fire, security vulnerability, and financial sensors are enabled, as indicated by the X's, whereas "seismic" is not.

In embodiments, the monitoring the one or more external modules includes monitoring a temperature module. For example, the sensor may be a thermometer. A low temperature threshold and a high threshold may be set by a user. See, for example, at 552 of FIG. 5B. If the temperature module senses temperatures below the low threshold or above the high threshold, a data protection plan change may be initiated.

In embodiments, the monitoring the one or more external modules includes monitoring a precipitation module. In general, module settings may be represented as represented at XYZ 562 of FIG. 5B. For example, the sensor may be a precipitation sensor, moisture sensor, barometric pressure sensor, or other weather sensor. In some embodiments, a single sensor may measure multiple parameters (e.g. moisture and precipitation). A high likelihood of a great amount of precipitation may indicate a threat to the computing system from flooding or other weather damage, like wind. If bad or extreme weather is predicted, a data protection plan change may be initiated.

In embodiments, the monitoring the one or more external modules includes monitoring a fire detection module. For example, the sensor may be a smoke detector. See, for example, at 554 of FIG. 5B. If the fire detection module senses smoke, a data protection plan change may be initiated.

In embodiments, the monitoring the one or more external modules includes monitoring a seismic activity module. For example, the sensor may be a seismic activity sensor that senses waves such as P waves indicating earthquakes. See, for example, 556 of FIG. 5B. If an impending earthquake is sensed, a data protection plan change may be initiated. The warning time for a seismic event may be too short to complete a full backup. One of the data protection plans can be established as an emergency protection plan, where the most critical files are backed up as soon as possible to a remote data store location. For example, if an impending earthquake is detected in the Los Angeles area, the data protection plan may include copying the most critical files to a remote data store in Salt Lake City, where the data would be safe from earthquake damage. There may not be sufficient time to perform a full backup when an impending earthquake is detected.

In embodiments, the monitoring the one or more external modules includes monitoring a moisture sensor module. Moisture sensor module settings may be represented at XYZ 562 of FIG. 5B. For example, the sensor may be a moisture sensor. This may indicate an unsafe build-up of water in the air, building, or vicinity. A moisture threshold may be set by a user. If the moisture module senses moisture that exceeds the threshold, a data protection plan change may be initiated.

In embodiments, the monitoring the one or more external modules includes monitoring a security vulnerability module. For example, the sensor may be a "crawler" that searches the World Wide Web. Alternatively, the sensor may be a firewall or computer scanning program configured to detect computer viruses, worms, or other threats. See, for example, at 558 of FIG. 5B. If a firewall or other program detects existence of a virus or intrusion attempt, a data protection plan change may be initiated. If the crawler determines a new widespread threat is being discussed in the news, a data protection plan change may be initiated since the existence of the threat increases the data risk.

In embodiments, the monitoring the one or more external modules includes monitoring a financial activity module. For example, the sensor may be a "crawler" that searches the World Wide Web or uses an API such as the Yahoo® Finance API, or other suitable API. Alternatively, the sensor may scan an RSS or other type of data feed. The data reviewed can be financial information. In embodiments, the financial information may include a stock price. In embodiments, the financial information may include a stock activity level (e.g., number of shares traded per unit of time). For example, a user may set a low price threshold and a high price threshold. Alternatively, or in addition, a user may set a stock activity limit threshold. See, for example, 560 of FIG. 5B. In the example, the user has set a lower limit of $30 and an upper limit of $70. The limit of stock activity is set to 3 million shares. If, for example, the stock price increases to $85, or activity hits $3.5 million shares traded, a data protection plan change may be initiated. In embodiments, the processor within the storage management system 110 performs the computation to select a different data protection plan.

The above-identified examples of modules and sensors are examples, and more, fewer, or different modules and sensors may be included in implementations of embodiments of the invention.

Figure 6:
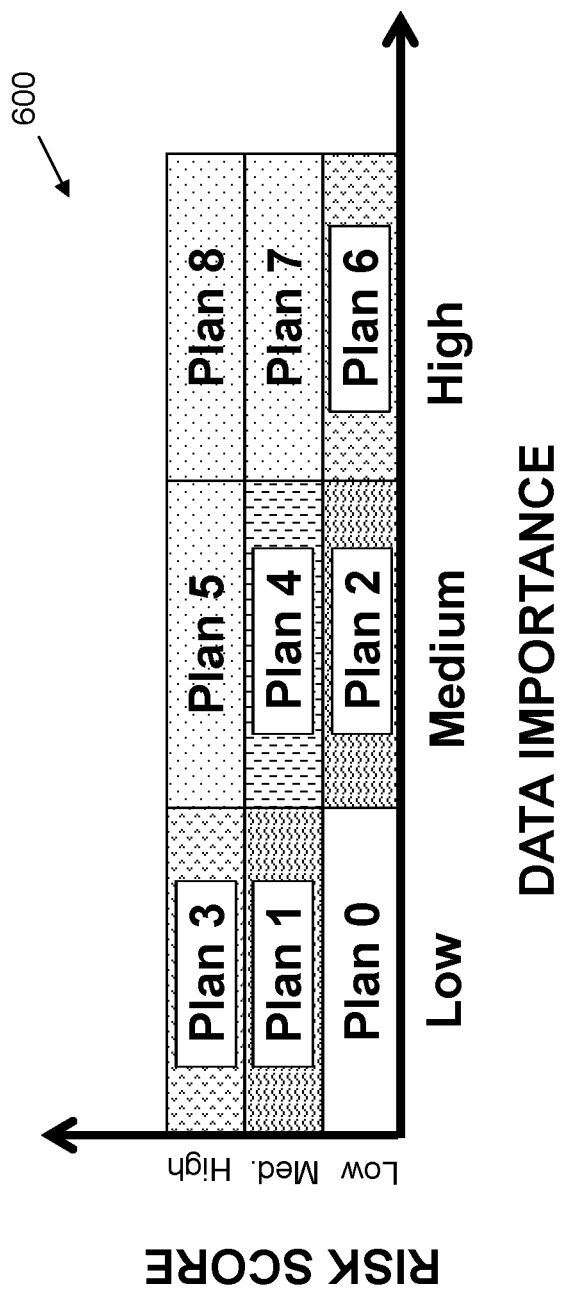
FIG. 6 shows a relationship between risk score, data importance, and data protection plans.

FIG. 6 shows a relationship between risk score, data importance, and data protection plans. Graph 600 shows nine data protection plans rated on the y-axis by "risk score" and on the x-axis by "data importance." As described herein, external factors are measured that influence the risk score of data loss. Based on the available historical data and statistics (i.e., how the external factors influenced the system's condition and number of disasters and recoveries in the past), systems will be classified to one of a set of plans. In the example, there are nine possible plans.

The data protection plan can be selected based on the following elements. An initial criticality of data stored on a computer system is assessed. For example, a questionnaire may be filled out by a user as shown in FIG. 5A. An initial risk score is computed based on the initial criticality and a plurality of situational factors received from one or more external modules. The situational factors are detected from the sensors (e.g., smoke, moisture, stock trading, etc.). An initial data protection plan is selected based on the initial risk score. The initial data retention plan may include a specified first frequency of backups and/or a first data retention period. One or more external modules are monitored, and a new risk score is computed based on detected changes in at least one of the plurality of situational factors. A different data protection plan is selected based on the new risk score.

The different (second) data retention plan may include a second specified frequency of backups and/or a second retention period.

More specifically, a data protection plan may include one or more of the following strategic factors:

Data protection method. This may include backup, storage snapshot, data mirroring, replication, or other suitable method.

Backup type. This may include full, incremental, or differential.

Frequency of backups.

Retention period.

Backup policy (i.e., schedule for each type of backup). For example, in some embodiments, a full backup on a weekly basis with incremental in between, may be performed.

Example plans include the following:

Plan 0: Standard data protection policy set by contract is applied.

Plan 4: Risk score and data importance at medium level. The policy ensures better protection and relatively faster recovery. Backup frequency is increased, backup policy is changed (full backups more often, more incremental backups in between the full backups). Embodiments may use a mixed solution to ensure backup success and reduce the risk of related data business interruptions.

Plan 8: Increased data criticality and a high risk of data loss. This strategy ensures the best performance and accuracy of data protection. Recovery Point Objective (RPO) at minimal possible level. In some embodiments, the different plan includes a complete change of data protection methodology (example, replacing backup with data replication/mirroring).

In some embodiments, nine plans are used, with the backup frequency increasing in the higher numbered plans. In such an embodiment, the plans may be as follows:

Plan 0: Weekly full backup with incremental daily backups

Plan 1: Twice-weekly full backup with incremental daily backups

Plan 2: Monday-Wednesday-Friday full backup with incremental daily backups

Plan 3: Daily full backup with hourly incremental backups

Plan 4: Twice-weekly full backup with incremental daily backups

Plan 5: Twice-weekly full backup with incremental daily backups and one remote geographic site for data replication Plan 6: Daily full backup with hourly incremental backups Plan 7: Daily full backup with hourly incremental backups and one remote geographic site for alternate copy of backups Plan 8: Multiple remote geographic sites for data replication, indefinite retention period Other plans are possible. In some embodiments, more or fewer than nine plans may be used.

In one embodiment, the data importance D is given a weight of 15 for low importance, 25 for medium importance, and 35 for high importance. Similarly, the data risk R is given a weight of 10 for low risk, 20 for medium risk, and 30 for high risk.

A risk score P may then be computed as D×R, resulting in the following data protection plan assignment, based on risk and importance, as shown in Table 1:

TABLE 1

| IMPORTANCE (D) | RISK (R) | RISK SCORE (P) | PLAN |
|---|---|---|---|
| Low 15 | Low 10 | 150 | Plan 0 |
| Med 25 | Low 10 | 250 | Plan 2 |
| High 35 | Low 10 | 350 | Plan 6 |
| Low 15 | Med 20 | 300 | Plan 1 |
| Med 25 | Med 20 | 500 | Plan 4 |
| High 35 | Med 20 | 700 | Plan 7 |
| Low 15 | High 30 | 450 | Plan 3 |
| Med 25 | High 30 | 750 | Plan 5 |
| High 35 | High 30 | 1050 | Plan 8 |

Other algorithms for computing a data protection plan based on risk and score are possible.

Figure 7:
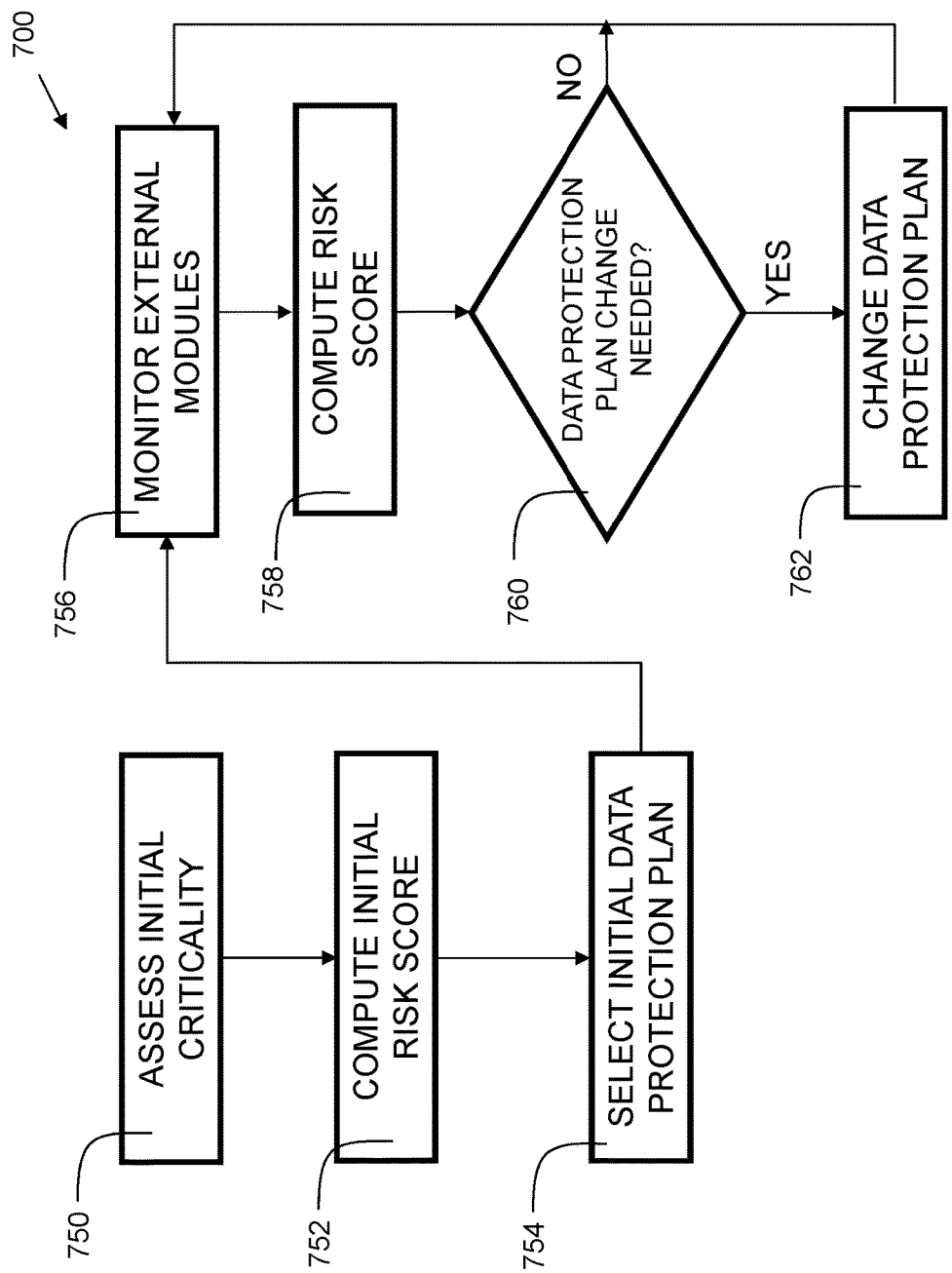
FIG. 7 is a flowchart for embodiments of the present invention.

FIG. 7 is a flowchart 700 for embodiments of the present invention. At 750, initial criticality is assessed. At 752, an initial risk score is computed. At 754, an initial data protection plan is selected. At 756, external modules are monitored. At 758, a risk score is computed. At 760, it is determined whether a data protection plan change is needed. If not, control is turned to block 756. If the change is needed, at 762, the data protection plan is changed, and control is then returned to block 756. In some embodiments, the different data protection plan includes an increased frequency of backups. In some embodiments, the different data protection plan includes an increased retention period. Example scenarios follow:

Basic scenario (Plan 0):

Media storage required for one month: 20 TB with 5% of daily rate change

Data protection method: backup

Policy: Full backup (weekly)+incremental (daily)

Space requirements: space for 5 full backups+22 incremental backups $$(5*20\ TB)+(25*20\ TB*5\%)=125\ TB$$

Basic strategy category: Plan 0

Recovery Time Objective (RTO) in case of disaster: high (media required for recovery: most recent full backup+all incremental since full)

Costs: minimal (tape backup)

EXAMPLE SCENARIO 1

Due to increased risk score (calculated on external factors such as an upcoming weather change), the server category changes to Plan 1.

New policy applied: Full backup (every 3 days)+incremental

Space requirements: space for 11 full backups+19 incremental $$(11*20\ TB)+(19*20\ TB*5\%)=239\ TB$$

Strategy category: Plan 1

RTO in case of disaster: better (media required: most recent full backup+maximum 2 incremental)

Costs: increased (tape backup, more space required)

EXAMPLE SCENARIO 2

Customer has a critical server, containing main production database. Then, a high severity security vulnerability has been revealed which can lead to virus infection of servers using a particular application.

Before a remediation is announced and implemented, there is a concern of data security. The data protection plan is computed as plan 5.

New policy applied: storage level snapshots taken every 2 hours. Retention: 24 h
Space requirements: 12 snapshots daily

12*20 TB=240 TB

Strategy category: Plan 5
RTO in case of disaster: minutes (time of rolling back a snapshot copies)
Costs: high (storage level snapshot)

EXAMPLE SCENARIO 3

According to a weather forecast, a strong hurricane is forecast. Customer servers contain critical data and business continuity is required for production. Based on these factors, the data protection plan is set to plan 8, the most comprehensive plan.
New policy applied: real-time block-level storage replication to external DR (data replication) location.
Space requirements: 20 TB of external storage system in remote DR location. Reliable connectivity link between source and DR location
RTO in case of disaster: minutes (time of rebuilding customer environment on DR location and mapping the replicated disks to newly restored systems)
Costs: high (require additional storage, space for system recovery, connection link)
When situation goes back to normal (minimal risk rate), the base Plan 0 data protection strategy is applied back.

As can now be appreciated, disclosed embodiments provide a more efficient way to manage data protection plans. Plans can change dynamically and automatically due to external factors, and then revert to a baseline plan once a temporary risk has passed. The tradeoffs between cost, recovery time objective, and frequency of backup can be accommodated by the dynamic changing of the data protection plan based on the situational factors. This allows for improved efficiency and improved data protection for organizations that utilize computer data.

Some of the functional components described in this specification have been labeled as systems or units in order to more particularly emphasize their implementation independence. For example, a system or unit may be implemented as a hardware circuit comprising custom VLSI circuits or gate arrays, off-the-shelf semiconductors such as logic chips, transistors, or other discrete components. A system or unit may also be implemented in programmable hardware devices such as field programmable gate arrays, programmable array logic, programmable logic devices, or the like. A system or unit may also be implemented in software for execution by various types of processors. A system or unit or component of executable code may, for instance, comprise one or more physical or logical blocks of computer instructions, which may, for instance, be organized as an object, procedure, or function. Nevertheless, the executables of an identified system or unit need not be physically located together, but may comprise disparate instructions stored in different locations which, when joined logically together, comprise the system or unit and achieve the stated purpose for the system or unit.

Further, a system or unit of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices and disparate memory devices.

Furthermore, systems/units may also be implemented as a combination of software and one or more hardware devices. For instance, location determination and alert message and/or coupon rendering may be embodied in the combination of a software executable code stored on a memory medium (e.g., memory storage device). In a further example, a system or unit may be the combination of a processor that operates on a set of operational data.

As noted above, some of the embodiments may be embodied in hardware. The hardware may be referenced as a hardware element. In general, a hardware element may refer to any hardware structures arranged to perform certain operations. In one embodiment, for example, the hardware elements may include any analog or digital electrical or electronic elements fabricated on a substrate. The fabrication may be performed using silicon-based integrated circuit (IC) techniques, such as complementary metal oxide semiconductor (CMOS), bipolar, and bipolar CMOS (BiCMOS) techniques, for example. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor devices, chips, microchips, chip sets, and so forth. However, the embodiments are not limited in this context.

Also noted above, some embodiments may be embodied in software. The software may be referenced as a software element. In general, a software element may refer to any software structures arranged to perform certain operations. In one embodiment, for example, the software elements may include program instructions and/or data adapted for execution by a hardware element, such as a processor. Program instructions may include an organized list of commands comprising words, values, or symbols arranged in a predetermined syntax that, when executed, may cause a processor to perform a corresponding set of operations.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, may be non-transitory, and thus is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Program data may also be received via the network adapter or network interface.

Computer readable program instructions for carrying out operations of embodiments of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of embodiments of the present invention.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

While the disclosure outlines exemplary embodiments, it will be appreciated that variations and modifications will occur to those skilled in the art. For example, although the illustrative embodiments are described herein as a series of acts or events, it will be appreciated that the present invention is not limited by the illustrated ordering of such acts or events unless specifically stated. Some acts may occur in different orders and/or concurrently with other acts or events apart from those illustrated and/or described herein, in accordance with the invention. In addition, not all illustrated steps may be required to implement a methodology in accordance with embodiments of the present invention. Furthermore, the methods according to embodiments of the present invention may be implemented in association with the formation and/or processing of structures illustrated and described herein as well as in association with other structures not illustrated. Moreover, in particular regard to the various functions performed by the above described components (assemblies, devices, circuits, etc.), the terms used to describe such components are intended to correspond, unless otherwise indicated, to any component which performs the specified function of the described component (i.e., that is functionally equivalent), even though not structurally equivalent to the disclosed structure which performs the function in the herein illustrated exemplary embodiments of the invention. In addition, while a particular feature of embodiments of the invention may have been disclosed with respect to only one of several embodiments, such feature may be combined with one or more features of the other embodiments as may be desired and advantageous for any given or particular application. Therefore, it is to be understood that the appended claims are intended to cover all such modifications and changes that fall within the true spirit of embodiments of the invention.

What is claimed is:

1. A computer system comprising:
    a processor;
    a memory coupled to the processor, the memory containing instructions, that when executed by the processor, perform the steps of:
    assessing an initial criticality of data stored on a computer system;
    computing an initial risk score based on the initial criticality and a plurality of situational factors received from one or more external modules, wherein the one or more external modules comprises a web crawler, and wherein the plurality of situational factors includes a stock activity level and a stock price;
    selecting an initial data protection plan based on the initial risk score, wherein the initial risk score is based on factors including: the stock activity level being within a predetermined threshold, and the stock price being within a predefined range;
    monitoring the one or more external modules and computing a new risk score based on detected changes of the plurality of situational factors, wherein the detected change is that the stock activity level exceeded the predetermined threshold and the stock price extending outside the predefined range;

selecting a different data protection plan in response to the new risk score; and backup data to a remote physical location based on the selected different data protection plan.

2. The computer system of claim 1, wherein assessing an initial criticality includes receiving an industry category or a system type category.

3. The computer system of claim 1, wherein assessing an initial criticality includes receiving a data importance category or a data activity category.

4. The computer system of claim 1, wherein the monitoring the one or more external modules includes monitoring a temperature module or a precipitation module.

5. The computer system of claim 1, wherein the monitoring the one or more external modules includes monitoring a fire detection module or a seismic activity module.

6. The computer system of claim 1, wherein the monitoring the one or more external modules includes monitoring a moisture sensor module or a financial activity module.

7. The computer system of claim 1, wherein the monitoring the one or more external modules includes monitoring a subset of external modules configured and disposed within a predetermined distance of the computer system.

8. The computer system of claim 1, wherein the different data protection plan includes data mirroring, an increased frequency of backups, or an increased retention period.

9. A computer program product for implementing a data protection strategy for an electronic computing device comprising a computer readable storage medium having program instructions embodied therewith, the program instructions executable by a processor to cause the electronic device to:

assess an initial criticality of data stored on a computer system;

compute an initial risk score based on the initial criticality and a plurality of situational factors received from one or more external modules, wherein the one or more external modules comprises a web crawler, and wherein the plurality of situational factors includes a stock activity level and a stock price;

select an initial data protection plan based on the initial risk score, wherein the initial risk score is based on factors including: the stock activity level being within a predetermined threshold, and the stock price being within a predefined range;

monitor the one or more external modules and computing a new risk score based on detected changes in the plurality of situational factors, wherein the detected change is that the stock activity level exceeded the predetermined threshold and the stock price extending outside the predefined range;

select a different data protection plan in response to the new risk score; and backup data to a remote physical location based on the selected different data protection plan.

10. The computer program product of claim 9, wherein assessing an initial criticality includes receiving an industry category or a system type category.

11. The computer program product of claim 9, wherein assessing an initial criticality includes receiving a data importance category or a data activity category.

12. The computer program product of claim 9, wherein the monitoring the one or more external modules includes monitoring a temperature module or a precipitation module.

13. The computer program product of claim 9, wherein the monitoring the one or more external modules includes monitoring a fire detection module or a seismic activity module.

14. The computer program product of claim 9, wherein the monitoring the one or more external modules includes monitoring a moisture sensor module or a financial activity module.

15. The computer program product of claim 9, wherein the monitoring the one or more external modules includes monitoring a subset of external modules configured and disposed within a predetermined distance of the computer system.

16. The computer program product of claim 9, wherein the different data protection plan includes data mirroring, an increased frequency of backups, or an increased retention period.

* * * * *